(12) United States Patent
Yokokawa

(10) Patent No.: US 6,898,262 B1
(45) Date of Patent: May 24, 2005

(54) PROGRAMMABLE CONTROLLER

(75) Inventor: Shinsuke Yokokawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 313 days.

(21) Appl. No.: 09/635,561

(22) Filed: Aug. 10, 2000

(30) Foreign Application Priority Data

Feb. 17, 2000 (JP) .................................. P. 2000-039851

(51) Int. Cl.⁷ .............................................. H03K 21/00
(52) U.S. Cl. .................. 377/47; 377/118; 713/500; 713/322; 713/320; 327/164; 710/260; 710/261; 710/262; 710/263; 710/264; 710/265; 710/266; 331/40; 331/178; 307/106
(58) Field of Search ................................. 713/500, 322, 713/320; 327/164; 710/260–266; 331/40, 178; 307/106; 377/47, 118

(56) References Cited

U.S. PATENT DOCUMENTS

| | | | | |
|---|---|---|---|---|
| 5,077,686 A | * | 12/1991 | Rubinstein ..................... | 377/47 |
| 5,555,225 A | * | 9/1996 | Hayashi et al. ............... | 368/10 |
| 5,848,265 A | * | 12/1998 | Maas et al. .................. | 713/500 |
| 5,881,297 A | * | 3/1999 | McKenzie et al. ............ | 713/300 |
| 5,918,058 A | * | 6/1999 | Budd ......................... | 710/316 |
| 5,996,083 A | * | 11/1999 | Gupta et al. ................ | 713/322 |
| 6,061,418 A | * | 5/2000 | Hassoun .................... | 327/115 |
| 6,173,409 B1 | * | 1/2001 | Watts et al. ................ | 713/322 |

FOREIGN PATENT DOCUMENTS

JP      05-296098      11/1993

OTHER PUBLICATIONS

Mitsubishi Sequencer Catalogue, Mitsubishi Denki K.K., Oct., 1999.

* cited by examiner

*Primary Examiner*—Anthony Knight
*Assistant Examiner*—Thomas Pham
(74) *Attorney, Agent, or Firm*—Sughrue Mion, PLLC

(57) ABSTRACT

An output cycle of a pulse string generated from a pulse generating section (2) is divided by a pulse dividing section (3) and a signal having a cycle which is plural times as great as the cycle of an output pulse is output from the pulse dividing section (3). This signal is input as an interruption request signal to a CPU (1). Consequently, the CPU (1) can execute an interruption processing in a cycle which is plural times as great as the cycle of the output pulse. By the interruption processing, the number of pulses to be output is controlled.

3 Claims, 4 Drawing Sheets

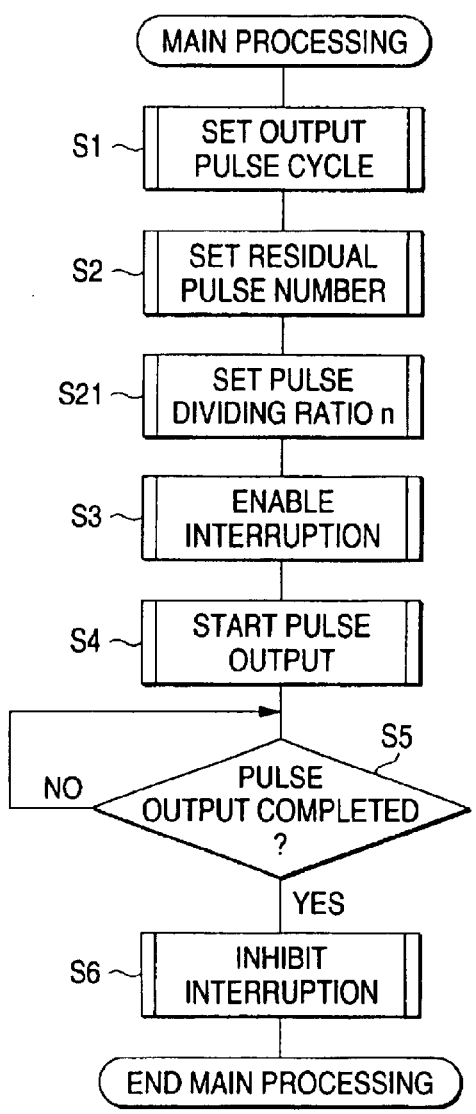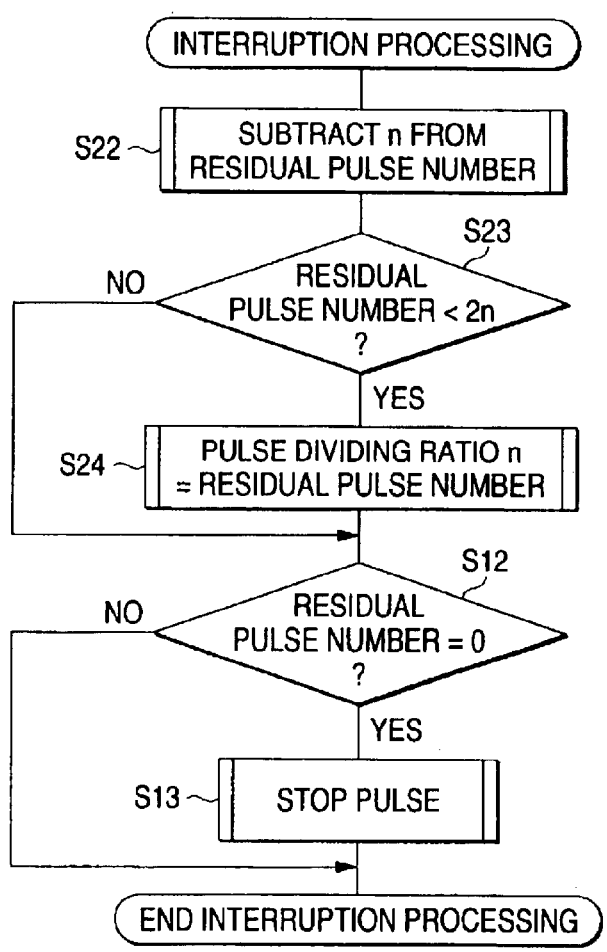
FIG. 2A
FIG. 2B

PROGRAMMABLE CONTROLLER

BACKGROUND OF THE INVENTION

The present invention relates to a programmable controller which performs high-speed pulse output to control a controlled apparatus for positioning control according to a user program.

FIG. 3 is a diagram showing the structure of a conventional programmable controller.

In FIG. 3, the reference numeral 1 denotes a central processing unit (which will be hereinafter referred to as a "CPU") for controlling each section of the programmable controller, and the reference numeral 2 denotes a pulse generating section for generating a pulse string in a cycle set by the CPU 1.

FIGS. 4A and 4B are flowcharts showing the operation of the conventional programmable controller. FIG. 4A shows a main processing and FIG. 4B shows an interruption processing.

In the main processing shown in FIG. 4A, first of all, the CPU 1 sets an output pulse cycle of the pulse generating section 2 at Step S1 and sets a residual pulse number indicative of an output pulse number at Step S2. Then, an interrupt enable state for enabling interruption is set at Step S3 and pulse output is started at Step S4. At Step S5, pulse output for the residual pulse number is carried out. When the pulse output is completed, an interrupt disable state is set at Step S6. Thus, the main processing is ended.

Every time one pulse is output at the Step S5, the interruption processing shown in FIG. 4B is executed. At Step S11, one is subtracted from the residual pulse number. When the residual pulse number reaches zero, a processing of stopping the pulse output is carried out at Step S13. Thus, the interruption processing is ended. If the residual pulse number is not zero at the Step S12, the interruption processing is ended and the control is returned to the main processing. By the main processing, the pulse output at the Step S5 is executed successively.

The conventional programmable controller comprises a CPU 1 for controlling each section and a pulse generating section 2 for generating a pulse string having a cycle set by the CPU 1 as shown in FIG. 3, and is controlled by control means for executing an interruption processing for each pulse output as shown in FIGS. 4A and 4B. The control means sequentially subtracts one from the residual pulse number for each output pulse, and executes the processing of stopping the pulse when the residual pulse number reaches zero.

In the conventional art, the CPU 1 should execute an interruption processing for each pulse output. For example, in case where a pulse of 200 KHz is output, an interruption cycle is 5 µs. Therefore, it is necessary to use a high-speed CPU applicable to the interruption processing having a cycle of 5 µS. However, the CPU applicable to such a high-speed processing using a general one-chip microcomputer is expensive. As a result, the cost of a product is increased.

SUMMARY OF THE INVENTION

The invention has been made to solve such a problem and has an object to obtain a programmable controller which is inexpensive and can carry out high-speed pulse output.

A programmable controller according to the invention comprises a pulse generating section for outputting a pulse string having a set cycle, a pulse dividing section for dividing the pulse string output from the pulse generating section at a predetermined dividing ratio and for outputting an interruption request signal having a cycle which is n times (n is a positive integer) as great as the cycle of the pulse string, and a central processing unit for executing an interruption processing in response to the interruption request signal output from the pulse dividing section, thereby controlling the output of the pulse generating section.

Moreover, the central processing unit sets a dividing ratio to be used for division of the pulse dividing section, controls the number of pulses output from the pulse generating section and sets the dividing ratio to be equal to the number of pulses which have not been output when the number of the pulses which have not been output is smaller than 2n.

Furthermore, the central processing unit changes the dividing ratio to be used for the division of the pulse dividing section depending on the cycle of the pulse string output from the pulse generating section.

BRIEF DESCRIPTION OF THE DRAWINGS

FIGS. 2A and 2B are flowcharts showing the operation of the programmable controller according to the first and second embodiments of the invention;

DETAILED DESCRIPTION OF THE PREFERRED EMBODIMENTS (First Embodiment)

Figure 1:
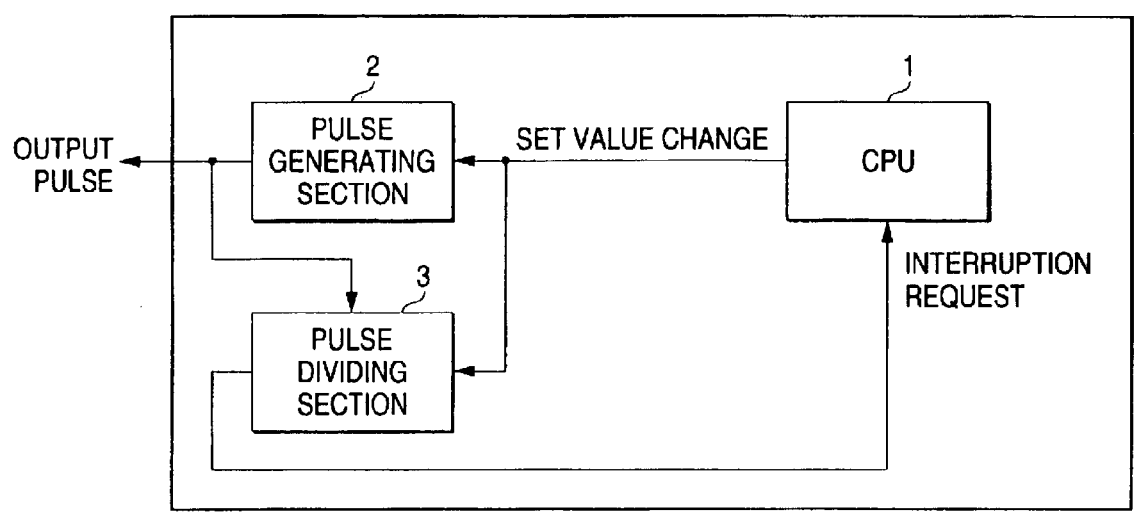
FIG. 1 is a diagram showing the structure of a programmable controller according to first and second embodiments of the invention.
Figure 3:
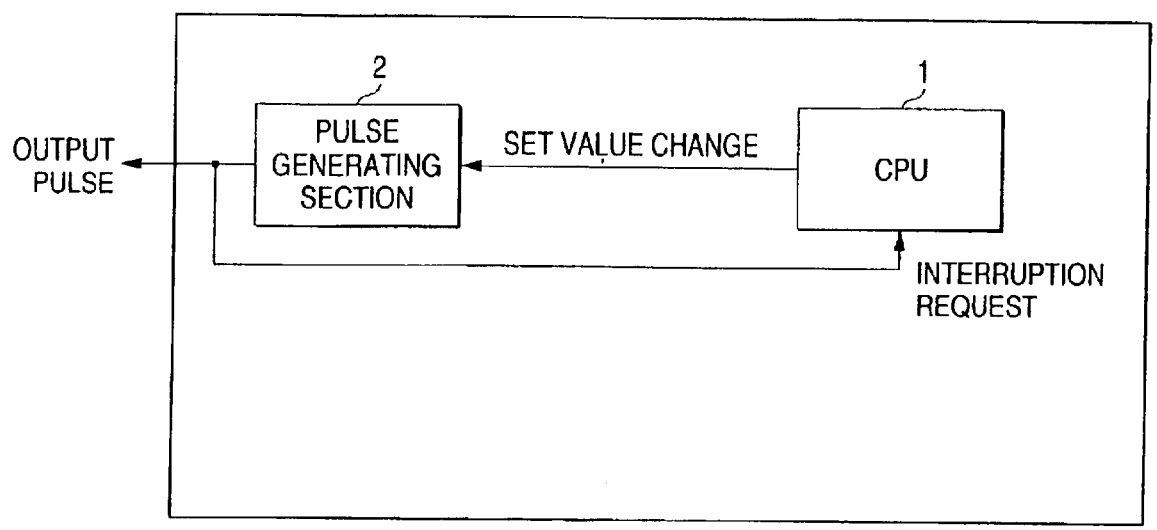
FIG. 3 is a diagram showing the structure of a conventional programmable controller.

FIG. 1 is a diagram showing the structure of a programmable controller according to a first embodiment of the invention.

In FIG. 1, the reference numeral 1 denotes a CPU for controlling each section in the programmable controller, the reference numeral 2 denotes a pulse generating section for generating a pulse string having a cycle set by the CPU 1, and the reference numeral 3 denotes a pulse dividing section for outputting, as an interruption request to the CPU 1, a signal obtained by dividing a pulse output from the pulse generating section 2 at a dividing ratio set by the CPU 1. The components 1 to 3 constitute the programmable controller. In the first embodiment, the CPU 1 controls an output pulse by control means for executing an interruption processing for each n-time pulse output.

FIGS. 2A and 2B are flowcharts showing the operation of the programmable controller according to the first embodiment of the invention. FIG. 2A shows a main processing and FIG. 2B shows an interruption processing.

Figure 4A:
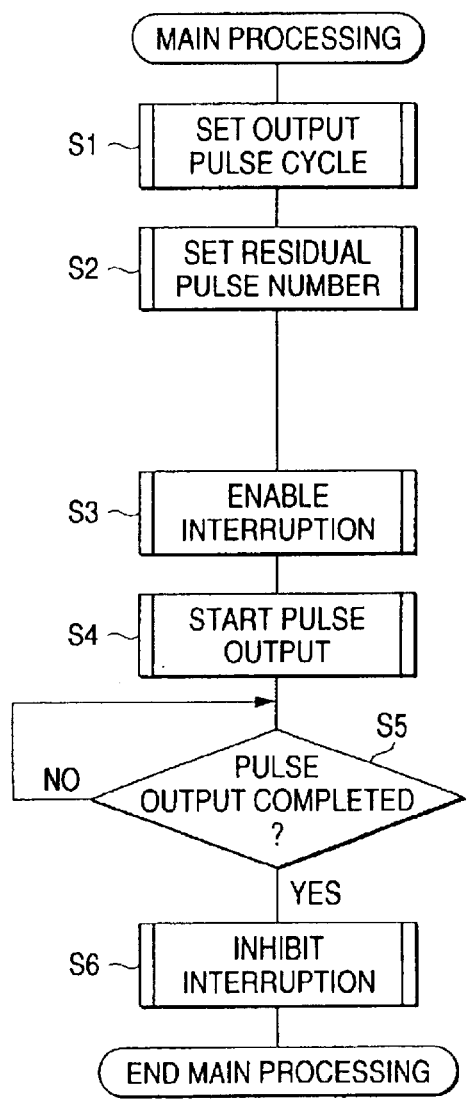
FIGS. 4A and 4B are flowcharts showing the operation of the conventional programmable controller.

In the main processing shown in FIG. 2A, Steps S1 and S2 are executed in the same manner as those in FIG. 4A. Then, a pulse dividing ratio n (n is a positive integer) of the pulse dividing section 3 is set at Step S21. Subsequently, processings are executed at Steps S3 to S6 in the same manner as those in FIG. 4A.

Figure 4B:
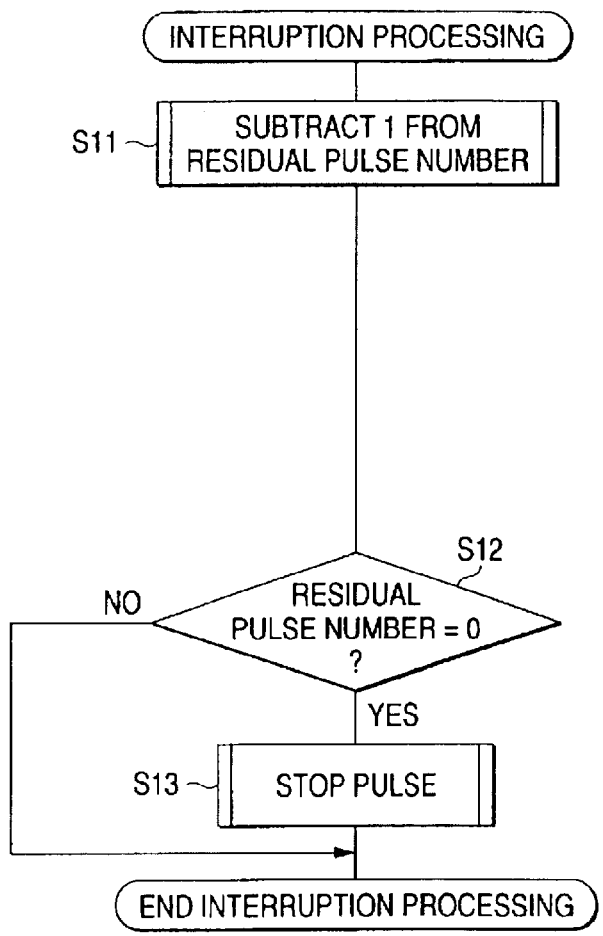

In the interruption processing shown in FIG. 2B, n is subtracted from a residual pulse number at Step 322. Then, if the residual pulse number <2n is satisfied at Step 523, the CPU 1 sets the pulse dividing ratio n to be equal to the residual pulse number at Step S24. Thereafter, the routine proceeds to Step S12. If the residual pulse number <2n is not satisfied at the Step S23, the routine proceeds to the Step S12. At the Steps S12 and S13, the same processings as those in FIG. 4B are executed.

In the first embodiment, the dividing ratio n is set to the pulse dividing section 3 by the CPU 1. Consequently, the cycle of the interruption processing is set to be n times as great as that of a pulse output from the pulse generating section 2. Therefore, the interruption processing can be executed by a CPU having a throughput of 1/n as compared with the conventional art. For example, in case where a dividing ratio of n=100 is set, an interruption cycle of 5 $\mu S \times 100 = 500$ $\mu S$ is obtained for outputting a pulse of 200 KHz. Thus, it is possible to obtain an interruption cycle to which an inexpensive one-chip microcomputer is fully applicable.

When the interruption processing is executed in a cycle which is n times as great as the cycle of the output pulse, the residual pulse number in the interruption processing can be checked only for each n-pulse. Consequently, it is possible to output only a pulse having a number which is integer times as great as n. In the first embodiment, a countermeasure is taken. More specifically, when the residual pulse number is smaller than 2n, the CPU 1 causes the pulse dividing section 3 to set a dividing ratio which is equal to the residual pulse number in the interruption processing shown in the Steps S23 and S24 of FIG. 2B. Consequently, when the next interruption is carried out, the residual pulse number reaches zero and the pulse output can be stopped with an optional pulse number.

While the pulse output is carried out n times for each interruption cycle after the pulse output is started and the pulse output is carried out in a final interruption cycle fraction times which are equal to or greater than n and smaller than 2n in the first embodiment, calculation is previously executed prior to the start of the pulse output so that the pulse can be output fraction times in an initial interruption cycle and n times which are equal to or greater than two until the final interruption cycle.

(Second Embodiment)

In a second embodiment, the same structure as that illustrated in FIG. 1 is employed, and the same operation as that shown in the flowcharts of FIGS. 2A and 2B is carried out.

A difference between the first and second embodiments will be described below.

In the first embodiment, the dividing ratio n has a predetermined value. If the frequency of an output pulse is increased, an interruption cycle for the CPU 1 is shortened in proportion thereto. In this case, a load on the CPU 1 is increased. Consequently, if the cycle of a pulse to be output is increased, the responsivity of processings other than the pulse output of the programmable controller is deteriorated.

In the second embodiment, the constant interruption cycle for the CPU 1 is maintained irrespective of a change in an output frequency. Therefore, even if the output pulse cycle is increased, the response of the processing other than the pulse output is not deteriorated.

In the second embodiment, the constant interruption cycle for the CPU 1 is maintained irrespective of a change in an output frequency. Therefore, even if the output pulse cycle is increased, the responsivity of the processings other than the pulse output is not deteriorated since the invention has the above-mentioned structure, the following effects can be obtained.

The programmable controller according to the invention comprises a pulse generating section for outputting a pulse string having a set cycle, a pulse dividing section for dividing the pulse string output from the pulse generating section at a predetermined dividing ratio and for outputting an interruption request signal having a cycle which is n times (n is a positive integer) as great as the cycle of the pulse string, and a central processing unit for executing an interruption processing in response to the interruption request signal output from the pulse dividing section, thereby controlling the output of the pulse generating section. Consequently, the cycle of the interruption processing can be increased, and the central processing unit having a low throughput is applicable to the interruption processing.

Moreover, the central processing unit sets a dividing ratio to be used for division of the pulse dividing section, controls the number of pulses output from the pulse generating section and sets the dividing ratio to be equal to the number of pulses which have not been output when the number of the pulses which have not been output is smaller than 2n. Therefore, a pulse which has not been output can be output in the final interruption processing.

Furthermore, the central processing unit changes the dividing ratio to be used for the division of the pulse dividing section depending on the cycle of the pulse string output from the pulse generating section. Consequently, an interruption processing having a cycle suitable for the central processing unit can be executed irrespective of the cycle of a pulse to be output.

What is claimed is:

1. A programmable controller for controlling a controlled apparatus by pulse output, comprising:

a pulse generating section for outputting a pulse string having a set cycle;

a pulse dividing section for dividing the pulse string output from said pulse generating section at a predetermined dividing ratio and for outputting an interruption request signal having a cycle which is n times as great as the cycle of the pulse string where n is a positive integer; and a central processing unit for executing an interruption processing in response to the interruption request signal output from said pulse dividing section so as to directly control the output of said pulse generating section, wherein the pulse dividing section determines the interruption request signal based on the dividing of the pulse string output.

2. The programmable controller according to claim 1, wherein said central processing unit sets a dividing ratio to be used for division of the pulse dividing section, controls the number of pulses output from said pulse generating section, and sets the dividing ratio to be equal to the number of pulses which have not been output when the number of the pulses which are output is smaller than 2n.

3. The programmable controller according to claim 1, wherein said central processing unit changes one dividing ratio to be used for the division of said pulse dividing section depending on the cycle of the pulse string output from said pulse generating section.

* * * * *